United States Patent
Kumar

(10) Patent No.: US 12,443,490 B2
(45) Date of Patent: Oct. 14, 2025

(54) FAILOVER RECOVERY TECHNIQUES FOR MULTI CLOUD RECOVERY

(71) Applicant: Rubrik, Inc., Palo Alto, CA (US)

(72) Inventor: Abhishek Kumar, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 49 days.

(21) Appl. No.: 17/884,549

(22) Filed: Aug. 9, 2022

(65) Prior Publication Data
US 2024/0054052 A1 Feb. 15, 2024

(51) Int. Cl.
| | | |
|---|---|---|
| G06F 3/06 | (2006.01) | |
| G06F 9/455 | (2018.01) | |
| G06F 11/14 | (2006.01) | |
| G06F 11/30 | (2006.01) | |
| H04L 12/26 | (2006.01) | |
| H04L 29/08 | (2006.01) | |
| H04L 29/12 | (2006.01) | |

(52) U.S. Cl.
CPC ...... *G06F 11/1464* (2013.01); *G06F 9/45558* (2013.01); *G06F 11/1469* (2013.01); *G06F 2009/45591* (2013.01); *G06F 2009/45595* (2013.01); *G06F 2201/815* (2013.01)

(58) Field of Classification Search
CPC ............ G06F 11/1464; G06F 9/45558; G06F 11/1469; G06F 2009/45591; G06F 2009/45595; G06F 2201/815
See application file for complete search history.

(56) References Cited

U.S. PATENT DOCUMENTS

| | | | | |
|---|---|---|---|---|
| 7,522,060 | B1 * | 4/2009 | Tumperi | G06Q 10/06 340/5.82 |
| 8,074,107 | B2 * | 12/2011 | Sivasubramanian | G06F 11/3006 714/4.12 |
| 8,595,547 | B1 * | 11/2013 | Sivasubramanian | G06F 11/2056 714/11 |
| 8,904,231 | B2 * | 12/2014 | Coatney | G06F 11/2023 714/4.11 |
| 9,652,333 | B1 * | 5/2017 | Bournival | G06F 9/4856 |
| 9,715,346 | B2 * | 7/2017 | Jain | G06F 11/1435 |
| 9,740,582 | B2 * | 8/2017 | Eluri | G06F 16/2343 |
| 10,114,564 | B2 * | 10/2018 | Jain | G06F 3/065 |

(Continued)

*Primary Examiner* — Umar Cheema
*Assistant Examiner* — Golam Mahmud
(74) *Attorney, Agent, or Firm* — Holland & Hart LLP

(57) ABSTRACT

A data management system (DMS) may support multi cloud failover recovery. For example, the DMS may receive a configuration for a failover recovery procedure. The configuration may include, for a set of virtual machines, respective target environments to which to recover the set of virtual machines as part of the failover recovery procedure. In response to a failover event, the DMS may deploy a respective network translator at the target environments. Additionally, as part of the failover recovery procedure, the DMS may instantiate the set of virtual machines on respective target environments. The network translators may store a location of virtual machines instantiated on the respective target environments. A request to access an application supported by the set of virtual machines may be received at a target environment, and the network translators may be used to route a packet associated with the request between the target environments.

20 Claims, 9 Drawing Sheets

(56) References Cited

U.S. PATENT DOCUMENTS

| | | | |
|---|---|---|---|
| 10,228,962 B2* | 3/2019 | Dornemann | G06F 11/2038 |
| 10,474,548 B2* | 11/2019 | Sanakkayala | G06F 11/203 |
| 10,503,612 B1* | 12/2019 | Wang | G06F 11/2023 |
| 10,630,638 B2* | 4/2020 | Lin | G06F 11/2023 |
| 10,862,887 B2* | 12/2020 | Han | G06F 9/45558 |
| 11,032,369 B1* | 6/2021 | Wei | H04L 61/2514 |
| 11,249,865 B1* | 2/2022 | Agrawal | G06F 11/1469 |
| 11,368,407 B2* | 6/2022 | Featonby | H04L 41/0663 |
| 11,411,808 B2* | 8/2022 | MacCarthaigh | G06F 11/2028 |
| 11,467,886 B2* | 10/2022 | Asayag | G06F 9/4856 |
| 11,494,268 B2* | 11/2022 | Shemer | G06F 11/3409 |
| 2015/0363282 A1* | 12/2015 | Rangasamy | G06F 11/2033 714/4.12 |
| 2016/0124665 A1* | 5/2016 | Jain | G06F 3/065 711/162 |
| 2016/0124764 A1* | 5/2016 | Nithrakashyap | G06F 3/0685 718/1 |
| 2016/0127307 A1* | 5/2016 | Jain | G06F 3/065 709/245 |
| 2017/0168903 A1* | 6/2017 | Dornemann | G06F 11/2038 |
| 2018/0006870 A1* | 1/2018 | McChord | H04L 41/0806 |
| 2018/0095855 A1* | 4/2018 | Sanakkayala | G06F 11/3006 |
| 2018/0113625 A1* | 4/2018 | Sancheti | G06F 3/067 |
| 2018/0293379 A1* | 10/2018 | Dahan | G06F 21/568 |
| 2019/0372908 A1* | 12/2019 | Featonby | H04L 47/746 |
| 2020/0119807 A1* | 4/2020 | Whitefield | H04B 7/18541 |
| 2020/0159634 A1* | 5/2020 | Gadgil | G06F 11/2097 |
| 2020/0341864 A1* | 10/2020 | Agrawal | G06F 11/1461 |
| 2020/0349018 A1* | 11/2020 | Meadowcroft | G06F 11/20 |
| 2020/0356452 A1* | 11/2020 | Shpilyuck | G06F 11/203 |
| 2021/0004292 A1* | 1/2021 | Zlotnick | G06F 9/4416 |
| 2021/0103507 A1* | 4/2021 | Pfister | H04L 61/2503 |
| 2021/0282187 A1* | 9/2021 | Agiwal | H04W 74/0841 |
| 2021/0349767 A1* | 11/2021 | Asayag | G06F 9/4856 |
| 2022/0374519 A1* | 11/2022 | Botelho | G06F 11/1464 |
| 2023/0289263 A1* | 9/2023 | Yang | G06F 11/1456 |
| 2023/0315592 A1* | 10/2023 | Su | G06F 11/2048 714/4.11 |

\* cited by examiner

FAILOVER RECOVERY TECHNIQUES FOR MULTI CLOUD RECOVERY

FIELD OF TECHNOLOGY

The present disclosure relates generally to database management, and more specifically to failover recovery techniques for multi cloud recovery.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
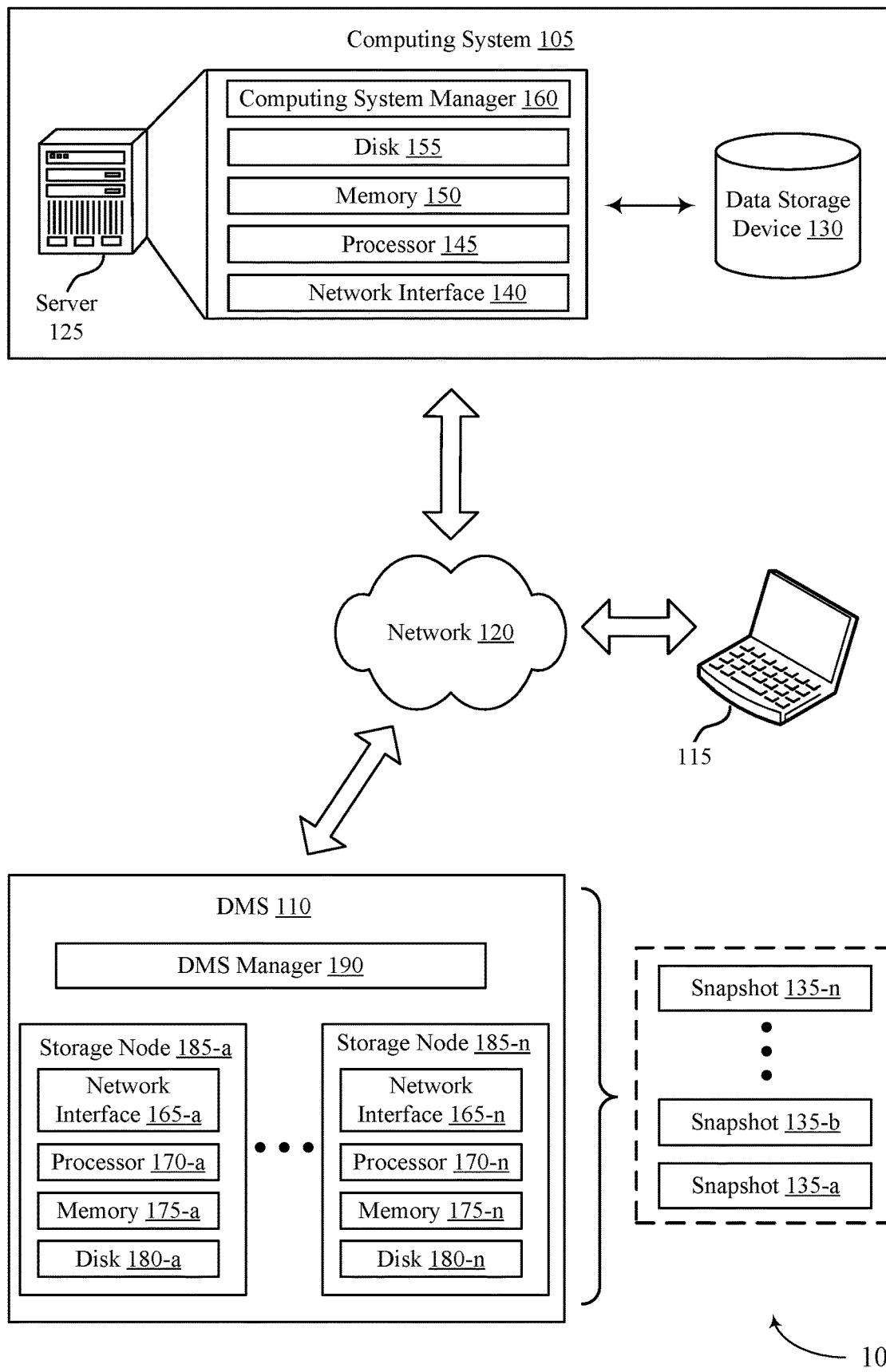
FIGS. 1, 2, and 3 illustrate examples of computing environments that support failover recovery techniques for multi cloud recovery in accordance with aspects of the present disclosure.

A data management system (DMS) may support failover recovery of virtual machines to a backup environment (e.g., computing system, data center, cloud environment) in case of a disaster. For example, a primary environment that hosts a set of virtual machines may fail in response to a failover event, such as a disaster, a ransomware attack, or a power outage, among other types of failover events that cause the primary environment to fail (e.g., no longer support the hosted virtual machines). The DMS may support backing up the set of virtual machines such that the DMS may recover the virtual machines to a secondary (e.g., backup) target environment, which may be referred to as failover recovery. In this way, one or more applications supported by the virtual machines may continue to be supported at the target environment.

In some examples, the DMS may support the recovery of virtual machines to a single target environment. However, in some cases, there may be unequal storage and/or computing capacity between the primary and target environments. Specifically, the target environment may have storage and/or computing capacity that is less than that of the primary environment, for example, due to costs associated with maintaining equal storage and/or computing capacity at the target environments. Accordingly, performance of an application running at the target environment may be degraded relative to the primary environment. Additionally or alternatively, the target environment may be a private environment (e.g., a private data center, a private cloud environment) or a public environment (e.g., a public cloud environment). However, one or more of the recovered virtual machines (e.g., a virtual machine used to verify credentials) may be private and should thus be kept within a private data center, such as for security and privacy purposes. Accordingly, if recovering the virtual machines to a target public environment, some private information may risk being exposed to the public. Alternatively, private virtual machines may not be recovered to the target public environment, but an application associated with the virtual machines may be unsupported due to not recovering the private virtual machines to the target public environment.

Further, in some cases, even if the virtual machines were able to be recovered to multiple target environments, virtual machines may be unaware of the locations of other virtual machines and the target environments to which they were recovered. As a result, it may unknown how to route requests to access an application supported by the virtual machines between the virtual machines and across target environments.

In accordance with examples described herein, a DMS may support failover recovery of virtual machines to multiple target environments and the management of traffic routing between virtual machines recovered to the multiple target environments. For example, as part of a failover recovery procedure, the DMS may deploy a respective network translator at the multiple target environments, which may manage networking and traffic routing between the virtual machines. For instance, a configuration for the failover recovery procedure may indicate a respective target environment to which to recover a set of virtual machines. The DMS may deploy the respective network translators and instantiate the set of virtual machines on respective target environments. The network translators may store the locations of the various virtual machines on the respective target environments, which may enable the network translators to be used to route packets associated with requests to access an application supported by the virtual machines between the virtual machines on the respective target environments.

By supporting the deployment and use of network translators at target environments, the DMS may support multi-environment (e.g., multi cloud) failover recovery while supporting proper traffic routing and application functionality. As a result, failover recovery techniques will be improved to satisfy security and privacy considerations and support increased flexibility, improved application performance, reduced latency, and reduced storage costs, among other benefits. For example, private virtual machines may be recovered to a target private environment, while other virtual machines may be recovered to a target private environment or a target public environment, thus enabling private virtual machines to remain secure during failover recovery. Additionally, virtual machines associated with different operations may be recovered to respective target environments having various storage capacities and/or computing capacities, which may support storage and computing resources to be allocated such that application performance and latency may be improved. Further, storage costs may be reduced while performance is maintained or improved, for example, by enabling computationally-heavier virtual machines to be recovered to relatively more expensive environments associated with faster processing (e.g., faster access speeds), while computationally-lighter virtual machines are recovered to relatively less expensive environments associated with slower processing.

Aspects of the disclosure are initially described in the context of computing environments. Aspects of the disclosure are further illustrated by and described with reference to apparatus diagrams, system diagrams, and flowcharts that relate to failover recovery techniques for multi cloud recovery.

FIG. 1 illustrates an example of a computing environment 100 that supports failover recovery techniques for multi cloud recovery in accordance with various aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In some examples, the computing system 105 may be an example of a primary environment or a target environment to which virtual machines are covered during a failover recovery procedure. For example, if the computing system 105 is a primary environment that fails based on a failover event, the DMS 110 may recover (e.g., restore, instantiate) the virtual machines of the computing system 105 to other target computing systems 105, for example, using snapshots 135 of the virtual machines. If the computing system 105 is a target environment, the DMS 110 may recover one or more virtual machines to the computing system 105 from a second computing system 105 that failed (e.g., using snapshots 135 of the one or more virtual machines). The DMS 110 may also recover other virtual machines of the second computing system 105 to one or more other target computing systems 105.

In accordance with examples described herein, the DMS 110 may support failover recovery to multiple target environments (e.g., target computing systems 105) while supporting proper traffic routing and application functionality. For example, the DMS 110 may instantiate various subsets of virtual machines on respective target environments as part of a failover recovery procedure. The DMS 110 may also deploy a network translator on the target environments, where the network translators may store the locations of the instantiated virtual machines. The virtual machines may support one or more applications, and a request to access an application supported by the virtual machines may be received, for example, at one of the target environments. In response to the request, one or more packets associated with the request may be routed between the virtual machines such that the request may be fulfilled.

Because the network translators store the locations of the virtual machines, the network translators may be used to route the packets between the virtual machines, including those on different target environments. For example, a first network translator may receive a packet from a first virtual machine on a first target environment. The packet may include an indication that a destination of the packet is a second virtual machine on a second target environment. The first network translator may determine a location of the second virtual machine on the second target environment based on the indication and route (e.g., transmit, forward) the packet to the second target environment (e.g., a second network translator on the second target environment), which may route the packet to the second virtual machine for processing. Thus, packets may be routed between virtual machines on different target environments (e.g., without the virtual machines being aware of the locations of the other virtual machines).

Figure 2:
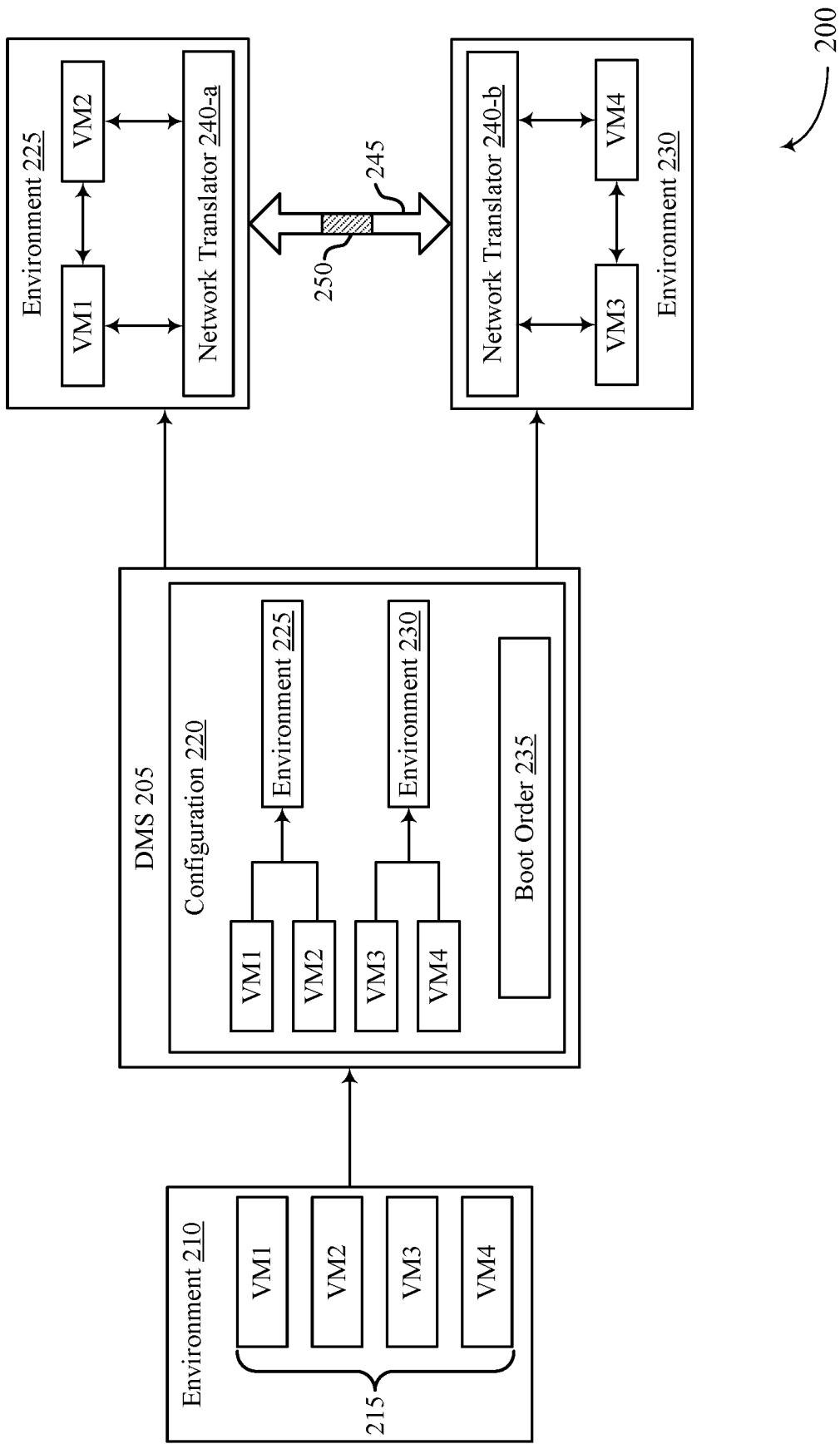

FIG. 2 illustrates an example of a computing environment 200 that supports failover recovery techniques for multi cloud recovery in accordance with aspects of the present disclosure. The computing environment 200 may implement or be implemented by aspects of the computing environment 100 described with reference to FIG. 1. For example, the computing environment 200 may include a DMS 205, which may be an example of a DMS 110 described herein, including with reference to FIG. 1. The computing environment 200 may also include various environments, which may be examples of one or more aspects of a computing system 105 described herein, including with reference to FIG. 1.

The computing environment 200 may include an environment 210, which may be an example of a primary environment used to host (e.g., store, support) a set of virtual machines 215. For instance, in the example of FIG. 2, the environment 210 may include the set of virtual machines 215, including virtual machines VM1, VM2, VM3, and VM4, although any quantity of virtual machines 215 may be included in the set of virtual machines 215. The virtual machines 215 may support one or more applications and may perform respective operations to support the one or more applications. For example, to support a video hosting application: one or more virtual machines 215 (e.g., a load-balance server) may perform load-balance operations to support reception, acceptance, denial, and queueing of initially received application requests; one or more virtual machines 215 (e.g., an identity server) may perform identity operations to verify whether the application request is from a legitimate (e.g., trusted, authorized) user; and one or more virtual machines 215 (e.g., a web server) may route verified requests to one or more virtual machines 215 (e.g., backend servers) that store and provision videos that may be requested to be accessed. Other virtual machines 215 performing other types of operations to support the video hosting application may be included. The quantity of virtual machines 215 and operations performed by the virtual machines 215 may vary depending on the particular type of application supported by the virtual machines 215.

In some examples, the environment 210 may be a private environment, such as a private data store, an on-prem data center, or a private cloud environment. For example, one or more of the virtual machines 215 (e.g., an identity server, among others) may be private virtual machines storing or otherwise being able to access private information (e.g., non-public information), such as private user information or private company information, among other types of private information. Accordingly, to maintain privacy and security of the private information, the environment 210 may be a private environment.

In some examples, the environment 210 may fail in response to a failover event. For example, the environment 210 may be subject to a ransomware attack, a disaster (e.g., a natural disaster at or near a geographic location where the environment 210 is hosted), or a power outage, among other types of failover events that cause the environment 210 fail. Failure of the environment 210 may render the virtual machines 215 inoperable or otherwise inaccessible such that the one or more applications may be unsupported.

To ensure continued support of the one or more applications when a failover event occurs, the DMS 205 may perform a failover recovery procedure during which the DMS 205 recovers the virtual machines 215 to multiple target environments. The DMS 205 may perform the failover recovery procedure in accordance with a configuration 220 for the failover recovery procedure. For instance, prior to a failover event, the DMS 205 may receive the configuration 220, for example, from the environment 210 or a user of the environment 210 and may store the configuration 220. The configuration 220 may include (e.g., indicate) target environments to which the DMS 205 is to recover the virtual machines 215 as part of the failover recovery procedure. For instance, in the example of FIG. 2, the configuration 220 may include a target environment 225 and a target environment 230 (e.g., for clarity, although any quantity of target environments may be included in the configuration 220). The configuration 220 may indicate that target environment for VM1 and VM2 is the target environment 225 and that the target environment for VM3 and VM4 is the target environment 230 (although other configurations of target environments are possible).

Based on the configuration 220, the DMS 205 may recover VM1 and VM2 to the target environment 225 and VM3 and VM4 to the target environment 230. For example, the DMS 205 may instantiate VM1 and VM2 (e.g., instances or copies of VM1 and VM2) on the target environment 225 and instantiate VM3 and VM4 on the target environment 230 in accordance with the configuration 220. In some examples, the DMS 205 may instantiate the virtual machines 215 on respective target environments using snapshots (e.g., snapshots 135) of the virtual machines 215 stored by the DMS 205.

In some examples, one or more of the target environments may be private environments. For example, private virtual machines on the environment 210 may be recovered to private environments to ensure that privacy for the private virtual machines is maintained. For instance, one or more of VM1 or VM2 may be private virtual machines and the environment 225 may be a private environment. Accordingly, the environment 225 may be selected as the target environment for recovery in the configuration 220 such that the private virtual machines may be recovered to a private environment. In some examples, both the environment 225 and the environment 230 may be private environment, and either of the environment 225 or 230 may selected as target environments for a private virtual machine. In some examples, the environment 230 may be a public environment (e.g., a public cloud environment) and may thus not be selected as a target environment for a private virtual machine. In some examples, both the environment 225 and the environment 230 may be public environments, for example, if none of the virtual machines 215 to be recovered are private virtual machines. In some examples, public virtual machines 215 may be recovered to either public environments or private environments.

Supporting the recovery of virtual machines 215 to various combinations of private and public environments may provide for increased flexibility in failover recovery procedures, privacy maintenance as part of failover recovery, reduced storage costs, and improved application performance on the recovered virtual machines 215, among other benefits. Additionally, because different subsets of virtual machines 215 may be recovered to different target environments, application traffic (e.g., a packet 250 associated with a request to access an application supported by the recovered virtual machines) may be routed between different target environments (e.g., at one or more points in time).

To support such traffic routing, the DMS 205 may deploy (e.g., instantiate, configure, install) network translators 240 on target environments, which may be used to route packets 250 between virtual machines. For example, in response to the failover event, the DMS 205 may deploy a network translator 240-*a* on the target environment 225 and a network translator 240-*b* on the target environment 230. In some examples, the DMS 205 may deploy the network translators 240 in accordance with the configuration 220. For instance, the DMS 205 may deploy a network translator 240 at each target environment included in the configuration 220. In some examples, the DMS 205 may deploy the network translators 240 before the virtual machines 215 are instantiated on respective target environments. In some examples, the DMS 205 may deploy the network translators 240 in conjunction with (e.g., concurrent with) or after instantiating the virtual machines 215 on respective target environments. In some examples, the network translators 240 may be examples of virtual machines instantiated on the respective target environments.

Communication channels 245 may be established (e.g., configured, created) between respective network translators 240 (e.g., by the DMS 205, by the network translators 240) such that packets 250 may be communicated between target environments (e.g., between the network translators 240). For example, using the network translators 240-*a* and 240-*b*, a communication channel 245, such as a network tunnel, may be established between the environment 225 and the environment 230 such that a packet 250 may be communicated between the environments 225 and 230 via the communication channel 245.

The network translators 240 may store information associated with the virtual machines 215 such that packet routing may be supported. For example, the network translators 240 may store the locations of the virtual machines 215 on the target environments. For instance, the network translators 240-*a* and 240-*b* may store location information indicating that VM1 and VM2 are located on the environment 225 and that VM3 and VM4 are located on the environment 230. The network translators 240 may be used to route a packet 250 based on storing the location information.

For example, in some cases, the packet 250 may be routed via the network translators 240. For instance, the packet 250 may be received at a first network translator 240 (e.g., the network translator 240-*a*) from a first virtual machine 215 (e.g., VM1 or VM2) on a first target environment (e.g., environment 225). The packet 250 may indicate a second virtual machine 215 (e.g., VM3 or VM4) as a destination of the packet 250, and the first network translator 240 may determine the location of the second virtual machine 215 based on storing the location information. The first network translator 240 may transmit (e.g., output, forward, send) the packet 250 to a second network translator 240 (e.g., the network translator 240-*b*) on a second target environment (e.g., environment 230) based on determining that the second virtual machine 215 is on the second target environment. The second network translator 240 may receive the packet 250 and transmit the packet 250 to the second virtual machine 215 based on storing the location of the second virtual machine 215.

In some other cases, information (e.g., location information) stored on the network translators 240 may be accessed to support routing the packet 250. For example, the first virtual machine 215 (e.g., or some other computing device on the first target environment that receives the packet 250 from the first virtual machine 215) may access the first network translator 240 to determine the location of the second virtual machine 215. Based on determining the location of the second virtual machine 215 using the first network translator 240, the first virtual machine 215 may transmit the packet 250 to the second virtual machine 215 (e.g., directly, or indirectly via a computing device on the second target environment that accesses the second network translator 240 to determine the location of the second virtual machine 215).

In some examples, a packet 250 routed between virtual machines 215 on a same target environment may be routed directly between the virtual machines 215 (e.g., without accessing a network translator 240, based on accessing a network translator 240 to retrieve location information) or via a network translator deployed on the target environment. Additional or alternative operations performed by and information stored by the network translators 240 to support routing packets 250 between the recovered virtual machines 215 are described with reference to FIG. 3 below.

In some examples, the recovered virtual machines 215 may be booted and packets 250 may be routed in accordance with a boot order 235 included in the configuration 220. For example, the configuration 220 may include a boot order 235 that indicates an order according to which the recovered virtual machines 215 are to be booted (e.g., booted up, initiated, powered on) so that application requests may be properly handled. For instance, a request to access an application supported by the virtual machines 215 may be initially received and processed at a virtual machine 215 that performs load-balance operations. However, if the load-balance virtual machine 215 is booted before other virtual machines 215 (e.g., identity, web, backend virtual machines 215) are booted and the load-balance virtual machine 215 receives a request before the other virtual machines 215 are booted, the load-balance virtual machine 215 may deny (e.g., reject) the request based on the other virtual machines 215 not yet being available (e.g., booted, initiated). In other words, if a request or packet 250 associated with the request is received at a booted virtual machine 215, but a next destination virtual machine 215 of the request or packet 250 is not yet booted, the request may be denied.

Accordingly, the boot order 235 may indicate the order according to which the recovered virtual machines 215 are to be booted such that denying a request due to a downstream virtual machine 215 not yet being booted may be avoided. The DMS 205 may boot the recovered virtual machines 215 (e.g., or cause the recovered virtual machines 215 to be booted) according to the boot order 235. Additionally, the recovered virtual machines 215 may be booted before a packet 250 is routed between virtual machines 215 to avoid packet rejection.

In some examples, to route a packet 250 in accordance with the boot order 235 may include routing the packet 250 to virtual machines 215 in a reverse order of the boot order 235. For example, the boot order 235 may include booting downstream virtual machines 215 before booting upstream virtual machines 215. For instance, in the video hosting application example, a backend server may be booted before a web server, which may be booted before an identity server, which may be booted before a load-balance server. However, the packet 250 may be routed to an upstream virtual machine 215 followed by progressively more downstream virtual machines 215. In other words, in some cases, the boot order 235 may correspond to a reverse order in which packets 250 are routed to virtual machines 215 to fulfill a request to access an application. In some examples, two or more virtual machines 215 may be booted concurrently (e.g., simultaneously, during overlapping time periods).

Figure 3:
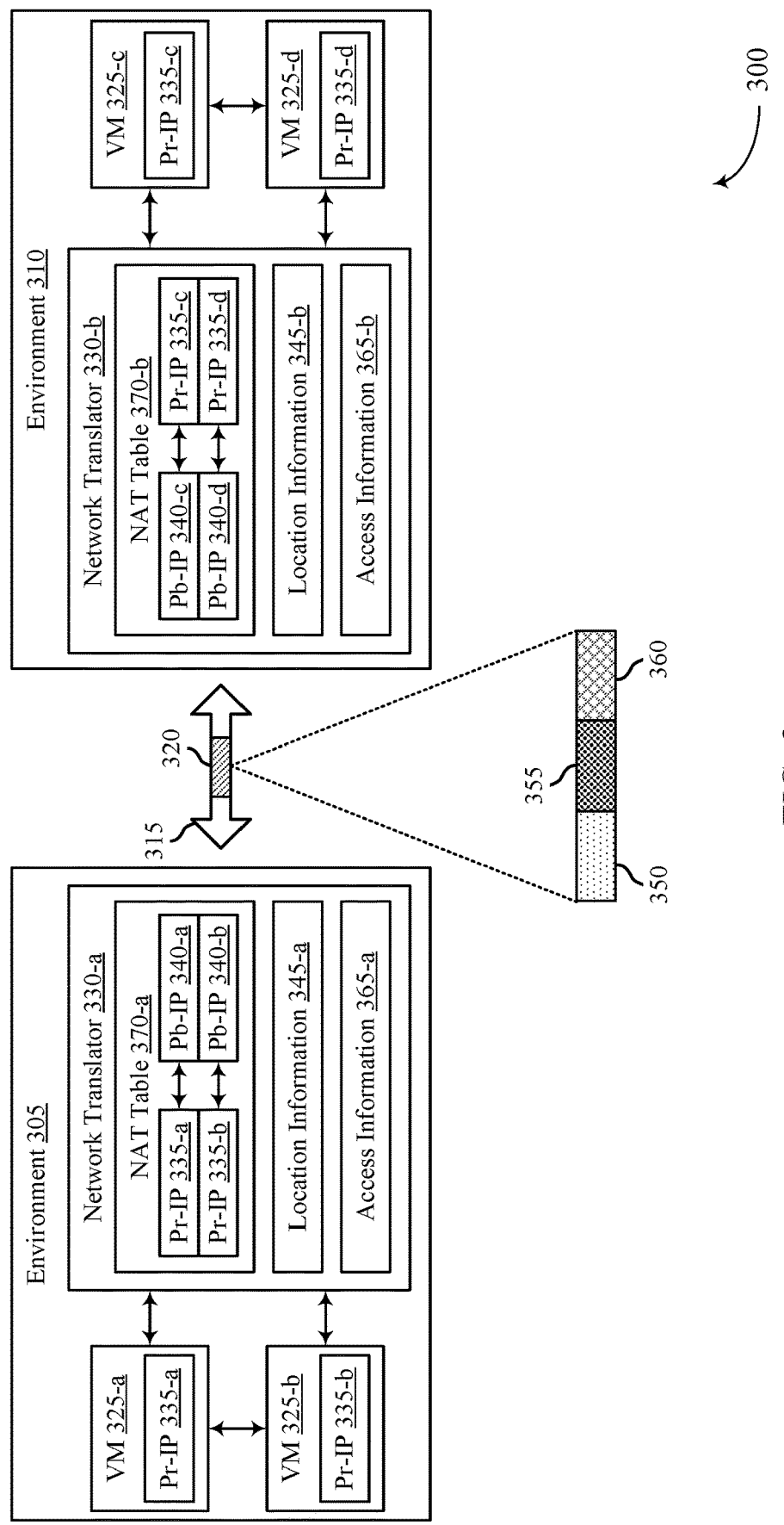

FIG. 3 illustrates an example of a computing environment 300 that supports failover recovery techniques for multi cloud recovery in accordance with aspects of the present disclosure. The computing environment 300 may implement or be implemented by aspects of the computing environments 100 and 200 described with reference to FIGS. 1 and 2, respectively. For example, the computing environment 300 may include an environment 305 and an environment 310, which may be an example of an environments (e.g., environments 225 and 230) or a computing system 105 described herein, including with reference to FIGS. 1 and 2.

The environment 305 and the environment 310 may be examples of target environments to which virtual machines 325 are recovered as part of a failover recovery procedure. For example, as part of the failover recovery procedure, a DMS may instantiate one or more virtual machines 325 on the environment 305 (e.g., virtual machines 325-a and 325-b) and one or more virtual machines 325 on the environment 310 (e.g., virtual machines 325-c and 325-d). The DMS may also deploy a network translator 330-a on the environment 305 and a network translator 330-b on the environment 310, which may be examples of network translators 240 described with reference to FIG. 2. In some examples, the environment 305 may be a private environment, and the environment may be a public environment, or vice versa. In some examples, the environments 305 and 310 may be a same type of environment (e.g., both private environments or both public environments).

A communication channel 315 may be established (e.g., as part of or after the failover recovery procedure) between the environment 305 and the environment 310, which may be an example of a communication channel 245. For example, packets 320 may be communicated between the environment 305 and the environment 310 via the communication channel 315, which may be an example of a network tunnel.

The network translators 330 may support the communication and routing of a packet 320 associated with a request to access an application supported by the virtual machines 325. For example, the network translators 330 may be used to route the packet 320 between virtual machines 325 located on different target environments, virtual machines 325 located on same target environments, or both.

To support routing of the packet 320, the network translators 330 may include various types of information. For example, the network translator 330-a may store location information 345-a, and the network translator 330-b may store location information 345-b. The location information 345 may include the target environments on which the virtual machines 325 are stored. For example, the location information 345 may store respective indications that the virtual machines 325-a and 325-b are located on (e.g., recovered to) the environment 305 and the virtual machines 325-c and 325-d are located on the environment 310. As such, the location information 345 may be used to determine an environment to which to route the packet 320 based on a destination virtual machine 325 of the packet 320.

Additionally or alternatively, the network translators 330 may include translation information that supports the translation of internet protocol (IP) address information when routing the packet 320 between environments (e.g., between the environment 305 and the environment 310). For instance, each of the virtual machines 325 may be associated with a respective private IP address 335, which may be used to uniquely identify the virtual machines 325. Additionally, each of the environment 305 and the environment 310 may be associated with a public IP address 340. A public IP address 340 of an environment may be used in communicating packets 320 outside of the environment, for example, to maintain the IP addresses 335 of virtual machines 325 as private. For example, if a packet 320 is transmitted by the virtual machine 325-*a* to a virtual machine 325 outside of the environment 305 (e.g., the virtual machine 325-*c*), a private IP address 335-*a* of the virtual machine 325-*a* may be translated (e.g., converted, mapped) to the public IP address 340 of the environment 305 using translation information stored in the network translator 330-*a*, and the public IP address 340 of the environment 305 may be included in the packet 320 as the source of the packet 320. Additionally, a public IP address 340 of the environment 310 may be included in the packet 320 as the destination of the packet 320 (e.g., based on the virtual machine 325-*c* being located on the environment 310).

In some examples, to support translation of a public IP address 340 to a private IP addresses 335 of a particular virtual machine 325 on an environment, the IP addresses may include or be associated with a port number associated with the virtual machine. For example, the private IP address 335-*a* may include or be associated with a private port number, which may be translated to a public port number and included in the public IP address 340 of the environment 305 (e.g., a public IP address 340-*a* that includes the public port number corresponding to the private port number of the virtual machine 325-*a*). Accordingly, a packet 320 transmitted by the virtual machine 325-*a* may include, as transmitted outside of the environment 305, the public IP address 340-*a* as the source of the packet 320. Here, if a response to the packet 320 destined for the virtual machine 325-*a* is received, the response may include the public IP address 340-*a* as the destination of the response. As such, the public port number included in the public IP address 340-*a* may be translated to the private port number associated with the virtual machine 325-*a*, the public IP address 335-*a* of the virtual machine 325-*a* may be determined based on the private port number, and the response may be routed to the virtual machine 325-*a*.

In some examples, a configuration for a failover procedure (e.g., a configuration 220) may include or be indicative of IP addresses associated the recovered virtual machines 325. For example, the configuration may include the private IP addresses 335 associated with the virtual machines 325, and the DMS may assign the private IP addresses 335 to the virtual machines 325 as part of the failover recovery procedure. In some examples, the configuration may indicate for the DMS to assign the same private IP addresses 335 to the virtual machines 325 that were assigned to the virtual machines 325 while instantiated on a primary environment (e.g., before being recovered to the environments 305 and 310) and are stored at or otherwise known to the DMS. In some cases, the configuration may include same private IP addresses 335.

The translation information stored on the network translators 330 (e.g., which may be stored at least in part as a network address translation (NAT) table 370) may be used to translate between private IP addresses 335 and public IP addresses 340 such that routing of the packet 320 may be supported. For example, in the example of FIG. 2, the network translator 330-*a* may include (e.g., store) a NAT table 370-*a*, and network translator 330-*b* may include a NAT table 370-*b*. The NAT table 370-*a* may include a mapping between the private IP address 335-*a* of the virtual machine 325-*a* and the public IP address 340-*a* of the environment 305 and between a private IP address 335-*b* of the virtual machine 325-*b* and a public IP address 340-*b* of the environment 305. In some examples, the public IP address 340-*a* and the public IP address 340-*b* may each include the same public IP address of the environment 305, but may include a public port number corresponding to a private port number of the virtual machines 325-*a* and 325-*b*, respectively (e.g., corresponding to the private IP address 335-*a* and 335-*b*, respectively). Similarly, the NAT table 370-*a* may include a mapping between private IP address 335-*c* of the virtual machine 325-*c* and a public IP address 340-*c* of the environment 310 and between a private IP address 335-*d* of the virtual machine 325-*d* and a public IP address 340-*d* of the environment 310. In some examples, the public IP address 340-*c* and the public IP address 340-*d* may each include the same public IP address of the environment 310, but may include a public port number corresponding to a private port number of the virtual machines 325-*c* and 325-*d*, respectively (e.g., corresponding to the private IP address 335-*c* and 335-*d*, respectively).

The network translators 330 may be used to translate information in a packet 320 received from a virtual machine 325 such that the packet 320 may be properly routed to a destination indicated by the virtual machine 325. For example, the network translator 330-*a* may receive a packet 320 from the virtual machine 325-*a* that includes an indication 360 that a destination of the packet 320 is the virtual machine 325-*c*. Based on the virtual machine 325-*a* being the source of the packet 320, the network translator 330-*a* may translate the private IP address 335-*a* to the public IP address 340-*a*. Based on the virtual machine 325-*c* being the destination of the packet 320, the network translator 330-*a* may determine that the virtual machine 325-*c* is on the environment 310 (e.g., based on location information 345-*a*) and may determine a public IP address 340 of the environment 310.

The network translator 330-*a* may transmit the packet 320 to the network translator 330-*b*, where the packet 320 includes a source field 350 and a destination field 355. The source field 350 may include the public IP address 340-*a*, and the destination field 355 may include the public IP address of the environment 310. The packet 320 may also include the indication 360 that the destination of the packet 320 is the virtual machine 325-*c*. In some examples, the translation information (e.g., or location information 345-*a*) stored on the network translator 330-*a* may also include a public port number associated with the virtual machines on the environment 310 (e.g., the virtual machines 325-*c* and 325-*d*). Here, the network translator 330-*a* may determine the public port number of the virtual machine 325-*c* based on the indication 360 (e.g., translate the indication 360 to the public port number of the virtual machine 325-*c*) and determine the public IP address 340-*c* that corresponds to the virtual machine 325-*c* (e.g., that includes the public port number of the virtual machine 325-*c*). For example, the network translator 330-*a* may add (e.g., append, insert) the public port number to the public IP address 340 of the environment 310 to generate the public IP address 340-*c*. In this case, the indication 360 may be included in the destination field 355, for example, as the public port number of the virtual machine 325-*c* included in the public IP address 340-*c*.

The network translator 330-*b* may receive the packet 320 from the network translator 330-*a* and may use the destination field 355 and the indication 360 to determine that the destination of the packet 320 is the virtual machine 325-*c*. For example, the network translator 330-*b* may use the public IP address 340 of the environment 310 included in the packet 320 and the indication 360 to determine the private IP address 335-*c* (e.g., determine the IP address 340-*c* for translation to the private IP address 335-*c*) and transmit the packet to the virtual machine 325-*c* based on determining the private IP address 335-*c*. Alternatively, the network translator 330-*b* may translate the public IP address 340-*c* included in the packet 320 to the private IP address 335-*c* and transmit the packet 320 to the virtual machine 325-*c*.

Packets 320 may similarly be routed from the environment 310 to the environment 305 using the network translators 330. For example, the network translator 330-*b* may receive a packet 320 from the virtual machine 325-*d* that includes an indication 360 that the destination of the packet 320 is the virtual machine 325-*b*. The network translator 330-*b* may translate the private IP address 335-*d* to the public IP address 340-*d* and determine a public IP address 340 of the environment 305 (e.g., a public IP address 340-*b*) based on the virtual machine 325-*b* being on the environment 305. The network translator 330-*b* may transmit the packet 320 to the network translator 330-*a* that includes the public IP address 340-*d* as the source, the public IP address 340 of the environment 305 as a destination, and the indication 360 (e.g., or the public IP address 340-*b* as the destination). The network translator 330-*a* may translate the destination information to the private IP address 335-*b* and transmit the packet 320 to the virtual machine 325-*b*.

In some examples, the network translators 330 may also include access information 365 to support proper routing of packets 320. For example, the network translator 330-*a* may include access information 365-*a* associated with accessing the environment 310, and the network translator 330-*b* may include access information 365-*b* associated with accessing the environment 305. For instance, the access information 365 may include access information, such as passwords, account information, firewall information, access protocols, or other access information that may be used to communicate with other target environments.

Figure 4:
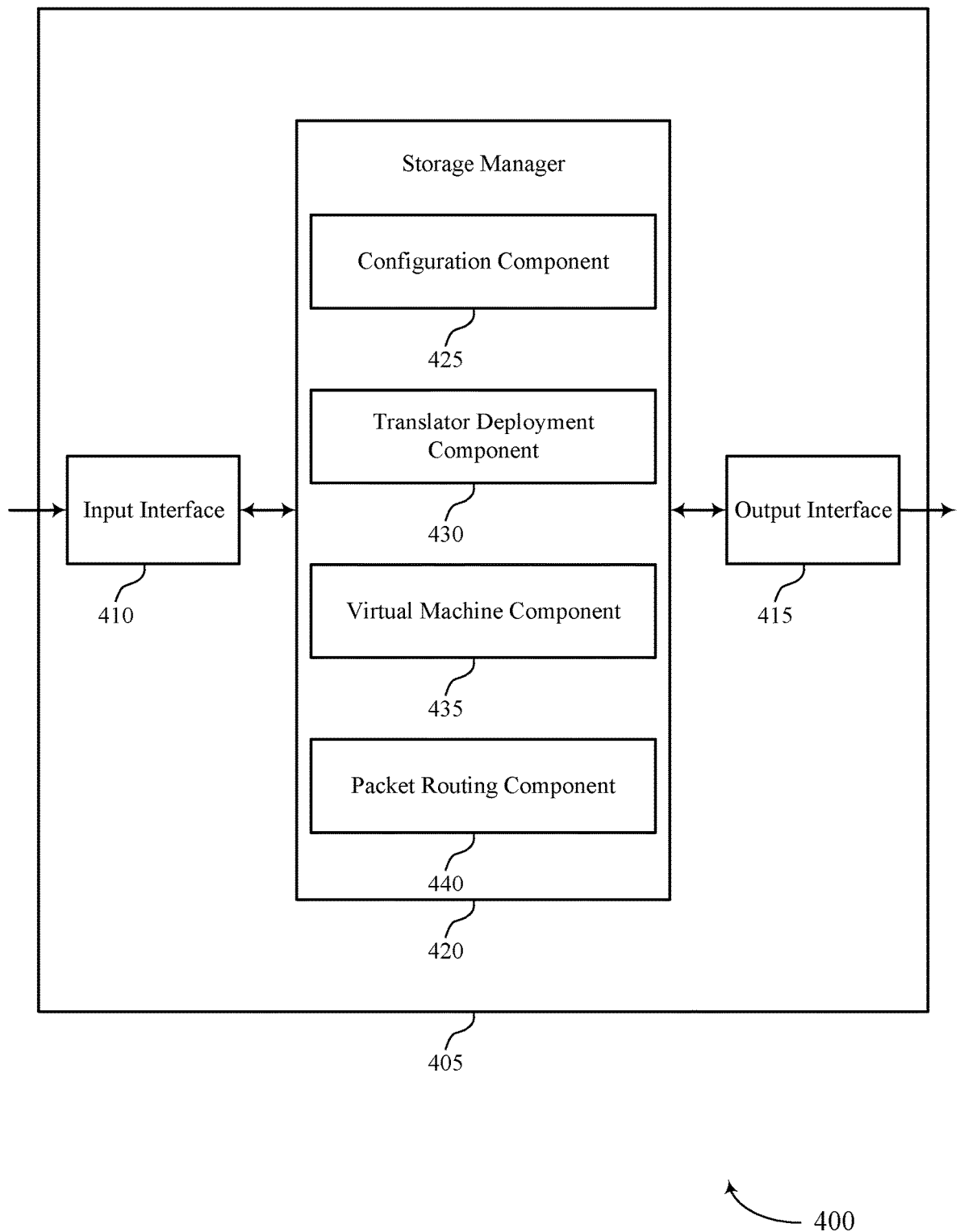
FIG. 4 shows a block diagram of an apparatus that supports failover recovery techniques for multi cloud recovery in accordance with aspects of the present disclosure.

FIG. 4 shows a block diagram 400 of a system 405 that supports failover recovery techniques for multi cloud recovery in accordance with aspects of the present disclosure. In some examples, the system 405 may be an example of aspects of one or more components described with reference to FIG. 1, such as a DMS 110. The system 405 may include an input interface 410, an output interface 415, and a storage manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the storage manager 420 to support failover recovery techniques for multi cloud recovery. In some cases, the input interface 510 may be a component of a network interface 615 as described with reference to FIG. 6.

The output interface 415 may manage output signaling for the system 405. For example, the output interface 415 may receive signaling from other components of the system 405, such as the storage manager 420, and may transmit such output signaling corresponding to (e.g., representative of or otherwise based on) such signaling to other systems or devices. In some cases, the output interface 415 may be a component of a network interface 615 as described with reference to FIG. 6.

The storage manager 420 may include a configuration component 425, a translator deployment component 430, a virtual machine component 435, a packet routing component 440, or any combination thereof. In some examples, the storage manager 420, or various components thereof, may be configured to perform various operations (e.g., receiving, monitoring, transmitting) using or otherwise in cooperation with the input interface 410, the output interface 415, or both. For example, the storage manager 420 may receive information from the input interface 410, send information to the output interface 415, or be integrated in combination with the input interface 410, the output interface 415, or both to receive information, transmit information, or perform various other operations as described herein.

The storage manager 420 may support data management in accordance with examples as disclosed herein. The configuration component 425 may be configured as or otherwise support a means for receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment. The translator deployment component 430 may be configured as or otherwise support a means for deploying, in response to a failover event that triggers the failover recovery procedure, a first network translator on the first target environment and a second network translator on the second target environment. The virtual machine component 435 may be configured as or otherwise support a means for instantiating, as part of the failover recovery procedure, the set of multiple virtual machines on respective target environments, where the first network translator and the second network translator store a location of virtual machines on the respective target environments. The packet routing component 440 may be configured as or otherwise support a means for using the first network translator and the second network translator to route a packet associated with a request to access an application supported by the set of multiple virtual machines between a first virtual machine on the first target environment and a second virtual machine on the second target environment.

Figure 5:
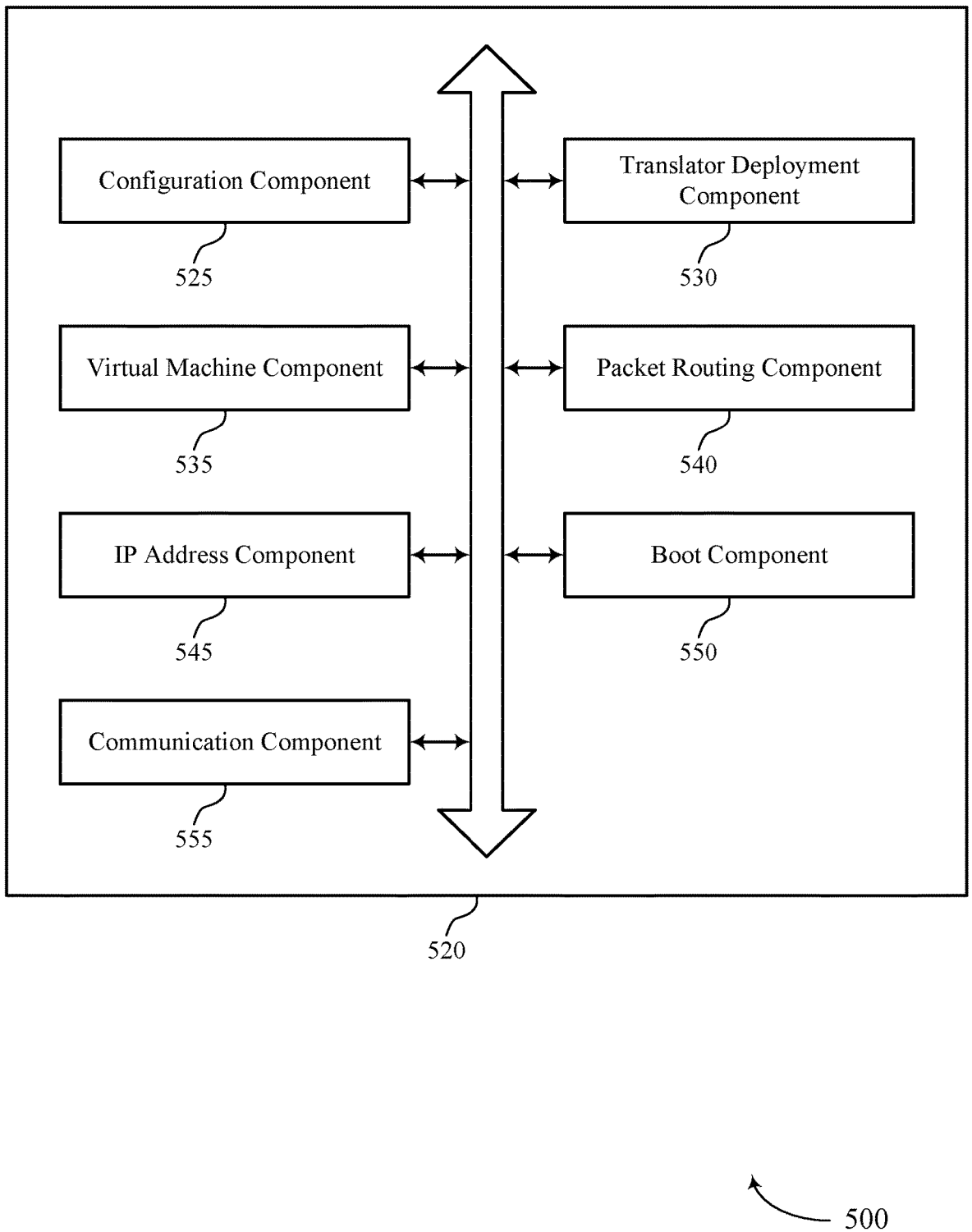
FIG. 5 shows a block diagram of a storage manager that supports failover recovery techniques for multi cloud recovery in accordance with aspects of the present disclosure.

FIG. 5 shows a block diagram 500 of a storage manager 520 that supports failover recovery techniques for multi cloud recovery in accordance with aspects of the present disclosure. The storage manager 520 may be an example of aspects of a storage manager or a storage manager 420, or both, as described herein. The storage manager 520, or various components thereof, may be an example of means for performing various aspects of failover recovery techniques for multi cloud recovery as described herein. For example, the storage manager 520 may include a configuration component 525, a translator deployment component 530, a virtual machine component 535, a packet routing component 540, an IP address component 545, a boot component 550, a communication component 555, or any combination thereof. Each of these components may communicate, directly or indirectly, with one another (e.g., via one or more buses, communications links, communications interfaces, or any combination thereof).

The storage manager 520 may support data management in accordance with examples as disclosed herein. The configuration component 525 may be configured as or otherwise support a means for receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment. The translator deployment component 530 may be configured as or otherwise support a means for deploying, in response to a failover event that triggers the failover recovery procedure, a first network translator on the first target environment and a second network translator on the second target environment. The virtual machine component 535 may be configured as or otherwise support a means for instantiating, as part of the failover recovery procedure, the set of multiple virtual machines on respective target environments, where the first network translator and the second network translator store a location of virtual machines on the respective target environments. The packet routing component 540 may be configured as or otherwise support a means for using the first network translator and the second network translator to route a packet associated with a request to access an application supported by the set of multiple virtual machines between a first virtual machine on the first target environment and a second virtual machine on the second target environment.

In some examples, to support using the first network translator and the second network translator to route the request, the packet routing component 540 may be configured as or otherwise support a means for receiving the packet from the first virtual machine, where the packet includes an indication that a destination of the packet is the second virtual machine. In some examples, to support using the first network translator and the second network translator to route the request, the packet routing component 540 may be configured as or otherwise support a means for using the first network translator to determine a location of the second virtual machine based on the indication that the destination of the packet is the second virtual machine. In some examples, to support using the first network translator and the second network translator to route the request, the packet routing component 540 may be configured as or otherwise support a means for transmitting the packet from the first target environment to the second target environment based on determining the location of the second virtual machine.

In some examples, to support using the first network translator and the second network translator to route the request, the packet routing component 540 may be configured as or otherwise support a means for receiving the packet from the second virtual machine, where the request includes an indication that a destination of the packet is the first virtual machine. In some examples, to support using the first network translator and the second network translator to route the request, the packet routing component 540 may be configured as or otherwise support a means for using the second network translator to determine a location of the first virtual machine based on the indication that the destination of the packet is the first virtual machine. In some examples, to support using the first network translator and the second network translator to route the request, the packet routing component 540 may be configured as or otherwise support a means for transmitting the packet from the second target environment to the first target environment based on determining the location of the first virtual machine.

In some examples, to support using the first network translator and the second network translator to route the request, the packet routing component 540 may be configured as or otherwise support a means for receiving the packet at the first network translator from the first virtual machine, where the packet includes an indication that a destination of the packet is the second virtual machine. In some examples, to support using the first network translator and the second network translator to route the request, the IP address component 545 may be configured as or otherwise support a means for using the first network translator to translate a first private IP address associated with the first virtual machine to a first public IP address associated with the first target environment. In some examples, to support using the first network translator and the second network translator to route the request, the IP address component 545 may be configured as or otherwise support a means for using the first network translator to determine a second public IP address associated with the second target environment based on the destination of the packet being the second virtual machine and the first network translator storing a location of the second virtual machine. In some examples, to support using the first network translator and the second network translator to route the request, the packet routing component 540 may be configured as or otherwise support a means for transmitting the packet to the second network translator, the packet including the first public IP address as a source environment of the packet, the second public IP address as a destination environment of the packet, and the indication that the destination of the packet is the second virtual machine.

In some examples, to support using the first network translator and the second network translator to route the request, the IP address component 545 may be configured as or otherwise support a means for using the second network translator to determine a second private IP address associated with the second virtual machine based on the indication that the destination of the packet is the second virtual machine. In some examples, to support using the first network translator and the second network translator to route the request, the packet routing component 540 may be configured as or otherwise support a means for transmitting the packet to the second virtual machine based on determining the second private IP address.

In some examples, to support using the second network translator to determine the second private IP address, the IP address component 545 may be configured as or otherwise support a means for using the second network translator to translate the indication that the destination of the packet is the second virtual machine to the second private IP address.

In some examples, to support using the first network translator and the second network translator to route the request, the packet routing component 540 may be configured as or otherwise support a means for receiving the packet at the second network translator from the second virtual machine, where the packet includes an indication that a destination of the packet is the first virtual machine. In some examples, to support using the first network translator and the second network translator to route the request, the IP address component 545 may be configured as or otherwise support a means for using the second network translator to translate a first private IP address associated with the second virtual machine to a first public IP address associated with the second target environment. In some examples, to support using the first network translator and the second network translator to route the request, the IP address component 545 may be configured as or otherwise support a means for using the second network translator to determine a second public IP address associated with the first target environment based on the destination of the packet being the first virtual machine and the second network translator storing a location of the first virtual machine. In some examples, to support using the first network translator and the second network translator to route the request, the packet routing component 540 may be configured as or otherwise support a means for transmitting the packet to the first network translator, the packet including the first public IP address as a source environment of the packet, the second public IP address as a destination environment of the packet, and the indication that the destination of the packet is the first virtual machine.

In some examples, to support using the first network translator and the second network translator to route the request, the IP address component 545 may be configured as or otherwise support a means for using the first network translator to determine a second private IP address associated with the first virtual machine based on the indication that the destination of the packet is the first virtual machine. In some examples, to support using the first network translator and the second network translator to route the request, the packet routing component 540 may be configured as or otherwise support a means for transmitting the packet to the first virtual machine based on determining the second private IP address.

In some examples, to support using the second network translator to determine the second private IP address, the IP address component 545 may be configured as or otherwise support a means for using the first network translator to translate the indication that the destination of the packet is the first virtual machine to the second private IP address.

In some examples, the boot component 550 may be configured as or otherwise support a means for booting, before routing the packet, the first virtual machine and the second virtual machine according to a boot order included in the configuration for the failover recovery procedure.

In some examples, the packet is routed from the first virtual machine to the second virtual machine or from the second virtual machine to the first virtual machine in accordance with a boot order of the set of multiple virtual machines included in the configuration for the failover recovery procedure.

In some examples, the configuration for the failover procedure includes a set of multiple IP addresses associated with the set of multiple virtual machines, and the virtual machine component 535 may be configured as or otherwise support a means for assigning, as part of the failover recovery procedure, respective IP addresses to respective virtual machines, where the first network translator and the second network translator store the location of the virtual machines on the respective target environments based on storing the assigned IP addresses.

In some examples, the communication component 555 may be configured as or otherwise support a means for establishing, using the first network translator and the second network translator, a communication channel between the first target environment and the second target environment, where the request to access the application is communicated between the first target environment and the second target environment via the communication channel.

In some examples, the first network translator stores a first NAT table including a first mapping between private IP addresses associated with virtual machines instantiated on the first target environment and a public IP address associated with the first target environment. In some examples, the second network translator stores a second NAT table including a second mapping between private IP addresses associated with virtual machines instantiated on the second target environment and a public IP address associated with the second target environment.

In some examples, the first network translator stores access information associated with accessing the second target environment and the second network translator stores access information associated with accessing the first target environment. In some examples, the packet is routed in accordance with the respective access information.

Figure 6:
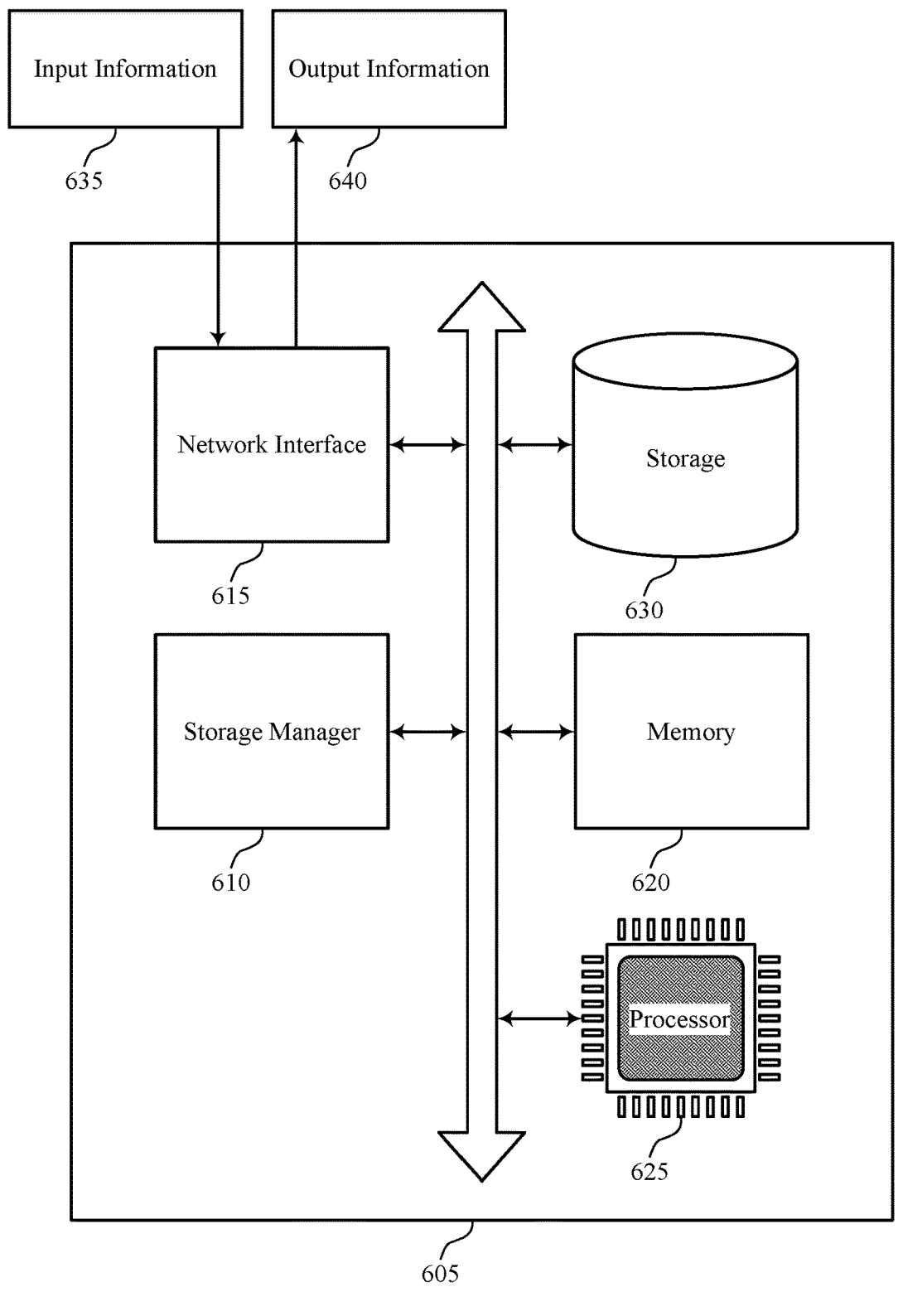
FIG. 6 shows a diagram of a system including a device that supports failover recovery techniques for multi cloud recovery in accordance with aspects of the present disclosure.

FIG. 6 shows a diagram of a system 600 including a system 605 that supports failover recovery techniques for multi cloud recovery in accordance with aspects of the present disclosure. The system 605 may be an example of or include the components of a system 405 as described herein. The system 605 may include components for data management including components such as a storage manager 610, a network interface 615, a memory 620, a processor 625, and storage 630. These components may be in electronic communication or otherwise coupled with each other (e.g., operatively, communicatively, functionally, electronically, electrically; via one or more buses, communications links, communications interfaces, or any combination thereof). Additionally, the components of the system 605 may comprise corresponding physical components or may be implemented as corresponding virtual components (e.g., components of one or more virtual machines). In some examples, the system 605 may be an example of aspects of one or more components described with reference to FIG. 1, such as a DMS 110.

The network interface 615 may enable the system 605 to exchange information (e.g., input information 635, output information 640, or both) with other systems or devices (not shown). For example, the network interface 615 may enable the system 605 to connect to a network (e.g., a network 120 as described herein). The network interface 615 may include one or more wireless network interfaces, one or more wired network interfaces, or any combination thereof. In some examples, the network interface 615 may be an example of may be an example of aspects of one or more components described with reference to FIG. 1, such as one or more network interfaces 165

Memory 620 may include RAM, ROM, or both. The memory 620 may store computer-readable, computer-executable software including instructions that, when executed, cause the processor 625 to perform various functions described herein. In some cases, the memory 620 may contain, among other things, a basic input/output system (BIOS), which may control basic hardware or software operation such as the interaction with peripheral components or devices. In some cases, the memory 620 may be an example of aspects of one or more components described with reference to FIG. 1, such as one or more memories 175.

The processor 625 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 625 may be configured to execute computer-readable instructions stored in a memory 620 to perform various functions (e.g., functions or tasks supporting storage tiering for computing system snapshots). Though a single processor 625 is depicted in the example of FIG. 6, it is to be understood that the system 605 may include any quantity of one or more of processors 625 and that a group of processors 625 may collectively perform one or more functions ascribed herein to a processor, such as the processor 625. In some cases, the processor 625 may be an example of aspects of one or more components described with reference to FIG. 1, such as one or more processors 170.

Storage 630 may be configured to store data that is generated, processed, stored, or otherwise used by the system 605. In some cases, the storage 630 may include one or more HDDs, one or more SDDs, or both. In some examples, the storage 630 may be an example of a single database, a distributed database, multiple distributed databases, a data store, a data lake, or an emergency backup database. In some examples, the storage 630 may be an example of one or more components described with reference to FIG. 1, such as one or more network disks 180.

The storage manager 610 may support data management in accordance with examples as disclosed herein. For example, the storage manager 610 may be configured as or otherwise support a means for receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment. The storage manager 610 may be configured as or otherwise support a means for deploying, in response to a failover event that triggers the failover recovery procedure, a first network translator on the first target environment and a second network translator on the second target environment. The storage manager 610 may be configured as or otherwise support a means for instantiating, as part of the failover recovery procedure, the set of multiple virtual machines on respective target environments, where the first network translator and the second network translator store a location of virtual machines on the respective target environments. The storage manager 610 may be configured as or otherwise support a means for using the first network translator and the second network translator to route a packet associated with a request to access an application supported by the set of multiple virtual machines between a first virtual machine on the first target environment and a second virtual machine on the second target environment.

By including or configuring the storage manager 610 in accordance with examples as described herein, the system 605 may support techniques for failover recovery of virtual machines to multiple target environments and packet routing and management between the target environments, which may provide for improved storage management, increased flexibility for failover recovery, increased security and privacy for failover recovery, reduced storage costs, reduced latency, and improved coordination between devices, among other benefits.

Figure 7:
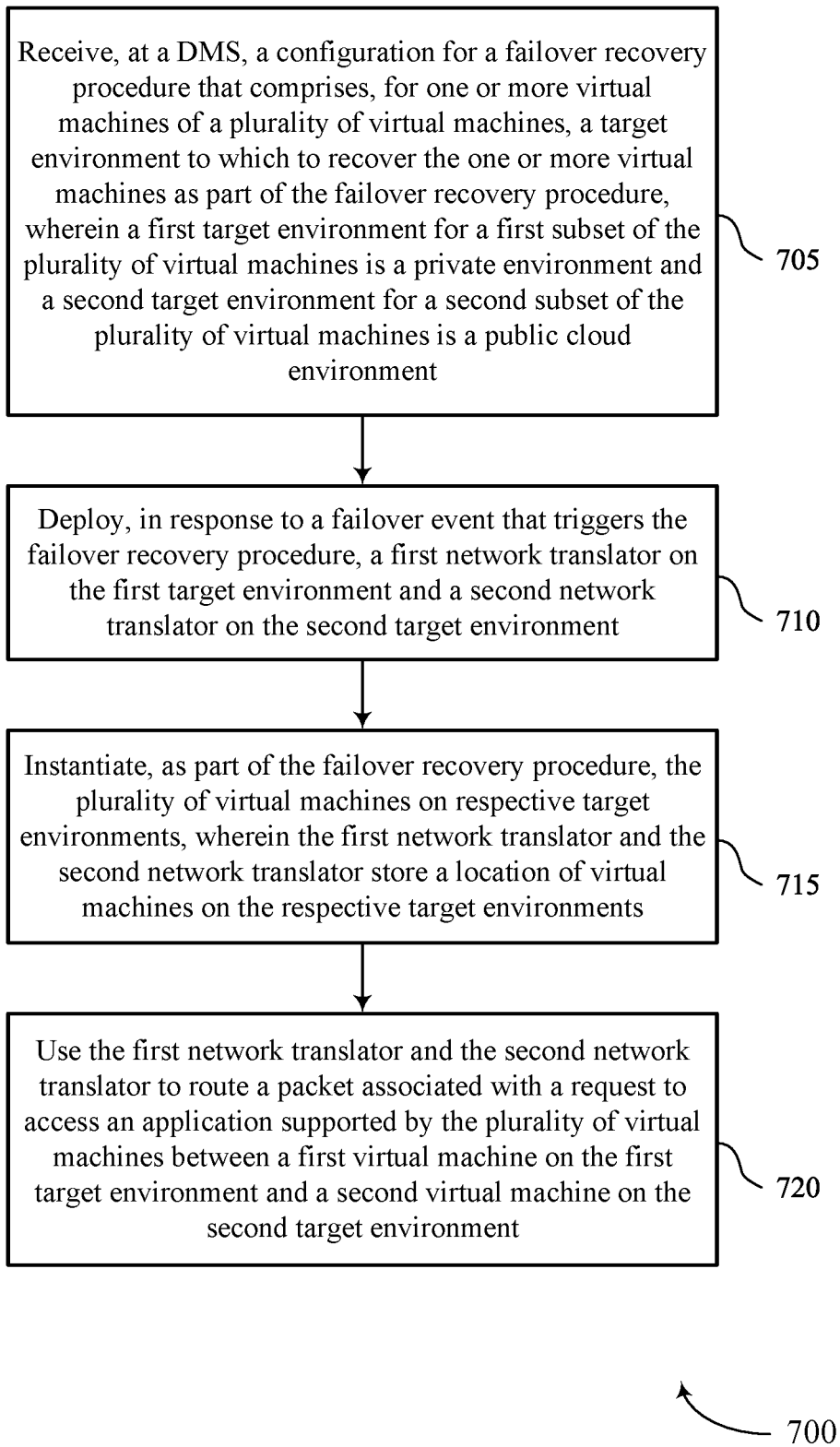
FIGS. 7 through 9 show flowcharts illustrating methods that support failover recovery techniques for multi cloud recovery in accordance with aspects of the present disclosure.

FIG. 7 shows a flowchart illustrating a method 700 that supports failover recovery techniques for multi cloud recovery in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment. The operations of 705 may be performed in accordance with examples as disclosed herein. In some examples, aspects of the operations of 705 may be performed by a configuration component 525 as described with reference to FIG. 5.

At 710, the method may include deploying, in response to a failover event that triggers the failover recovery procedure, a first network translator on the first target environment and a second network translator on the second target environment. The operations of 710 may be performed in accordance with examples as disclosed herein. In some examples, aspects of the operations of 710 may be performed by a translator deployment component 530 as described with reference to FIG. 5.

At 715, the method may include instantiating, as part of the failover recovery procedure, the set of multiple virtual machines on respective target environments, where the first network translator and the second network translator store a location of virtual machines on the respective target environments. The operations of 715 may be performed in accordance with examples as disclosed herein. In some examples, aspects of the operations of 715 may be performed by a virtual machine component 535 as described with reference to FIG. 5.

At 720, the method may include using the first network translator and the second network translator to route a packet associated with a request to access an application supported by the set of multiple virtual machines between a first virtual machine on the first target environment and a second virtual machine on the second target environment. The operations of 720 may be performed in accordance with examples as disclosed herein. In some examples, aspects of the operations of 720 may be performed by a packet routing component 540 as described with reference to FIG. 5.

Figure 8:
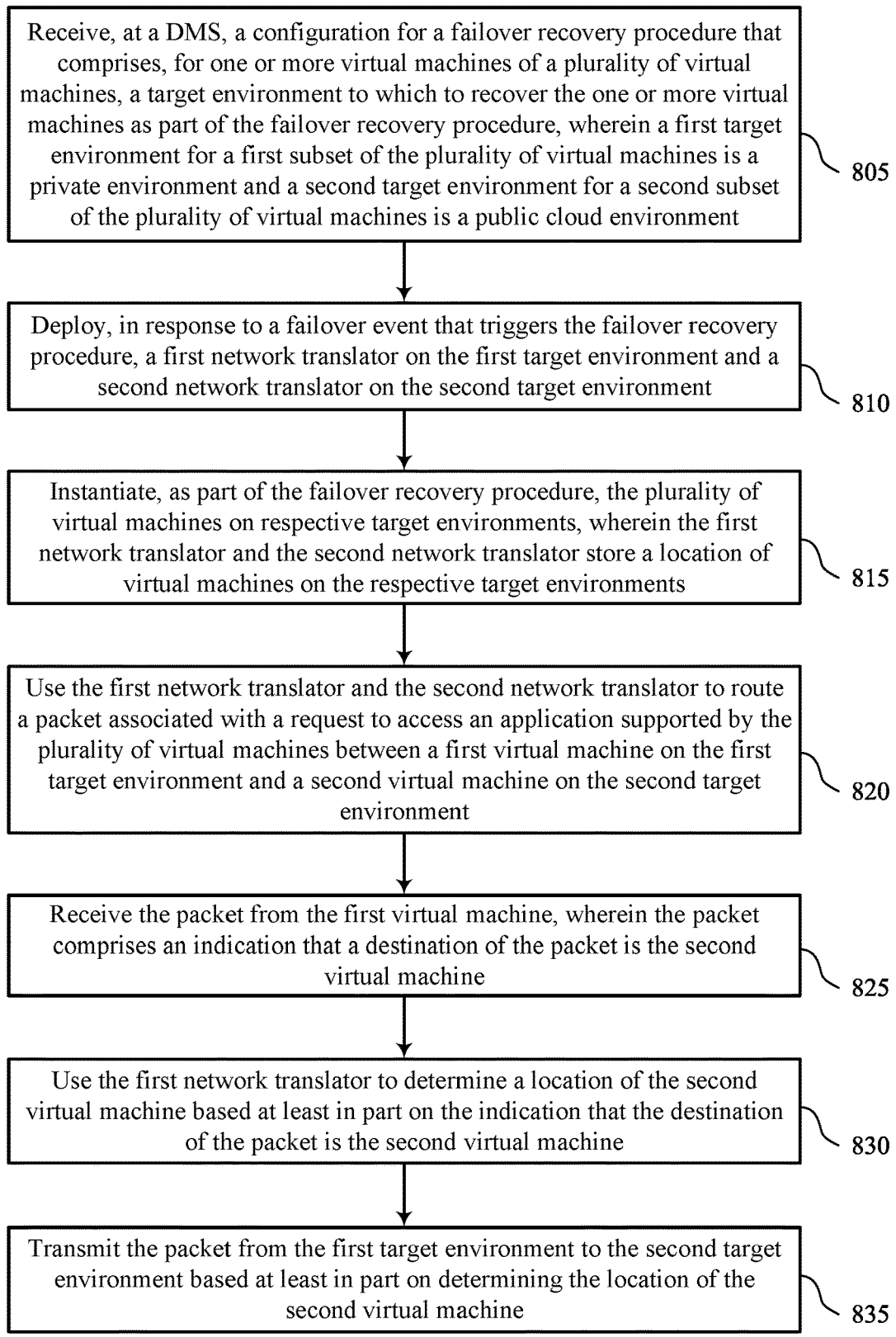

FIG. 8 shows a flowchart illustrating a method 800 that supports failover recovery techniques for multi cloud recovery in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment. The operations of 805 may be performed in accordance with examples as disclosed herein. In some examples, aspects of the operations of 805 may be performed by a configuration component 525 as described with reference to FIG. 5.

At 810, the method may include deploying, in response to a failover event that triggers the failover recovery procedure, a first network translator on the first target environment and a second network translator on the second target environment. The operations of 810 may be performed in accordance with examples as disclosed herein. In some examples, aspects of the operations of 810 may be performed by a translator deployment component 530 as described with reference to FIG. 5.

At 815, the method may include instantiating, as part of the failover recovery procedure, the set of multiple virtual machines on respective target environments, where the first network translator and the second network translator store a location of virtual machines on the respective target environments. The operations of 815 may be performed in accordance with examples as disclosed herein. In some examples, aspects of the operations of 815 may be performed by a virtual machine component 535 as described with reference to FIG. 5.

At 820, the method may include using the first network translator and the second network translator to route a packet associated with a request to access an application supported by the set of multiple virtual machines between a first virtual machine on the first target environment and a second virtual machine on the second target environment. The operations of 820 may be performed in accordance with examples as disclosed herein. In some examples, aspects of the operations of 820 may be performed by a packet routing component 540 as described with reference to FIG. 5.

At 825, to support using the first network translator and the second network translator to route the packet, the method may include receiving the packet from the first virtual machine, where the packet includes an indication that a destination of the packet is the second virtual machine. The operations of 825 may be performed in accordance with examples as disclosed herein. In some examples, aspects of the operations of 825 may be performed by a packet routing component 540 as described with reference to FIG. 5.

At 830, to support using the first network translator and the second network translator to route the packet, the method may include using the first network translator to determine a location of the second virtual machine based on the indication that the destination of the packet is the second virtual machine. The operations of 830 may be performed in accordance with examples as disclosed herein. In some examples, aspects of the operations of 830 may be performed by a packet routing component 540 as described with reference to FIG. 5.

At 835, to support using the first network translator and the second network translator to route the packet, the method may include transmitting the packet from the first target environment to the second target environment based on determining the location of the second virtual machine. The operations of 835 may be performed in accordance with examples as disclosed herein. In some examples, aspects of the operations of 835 may be performed by a packet routing component 540 as described with reference to FIG. 5.

Figure 9:
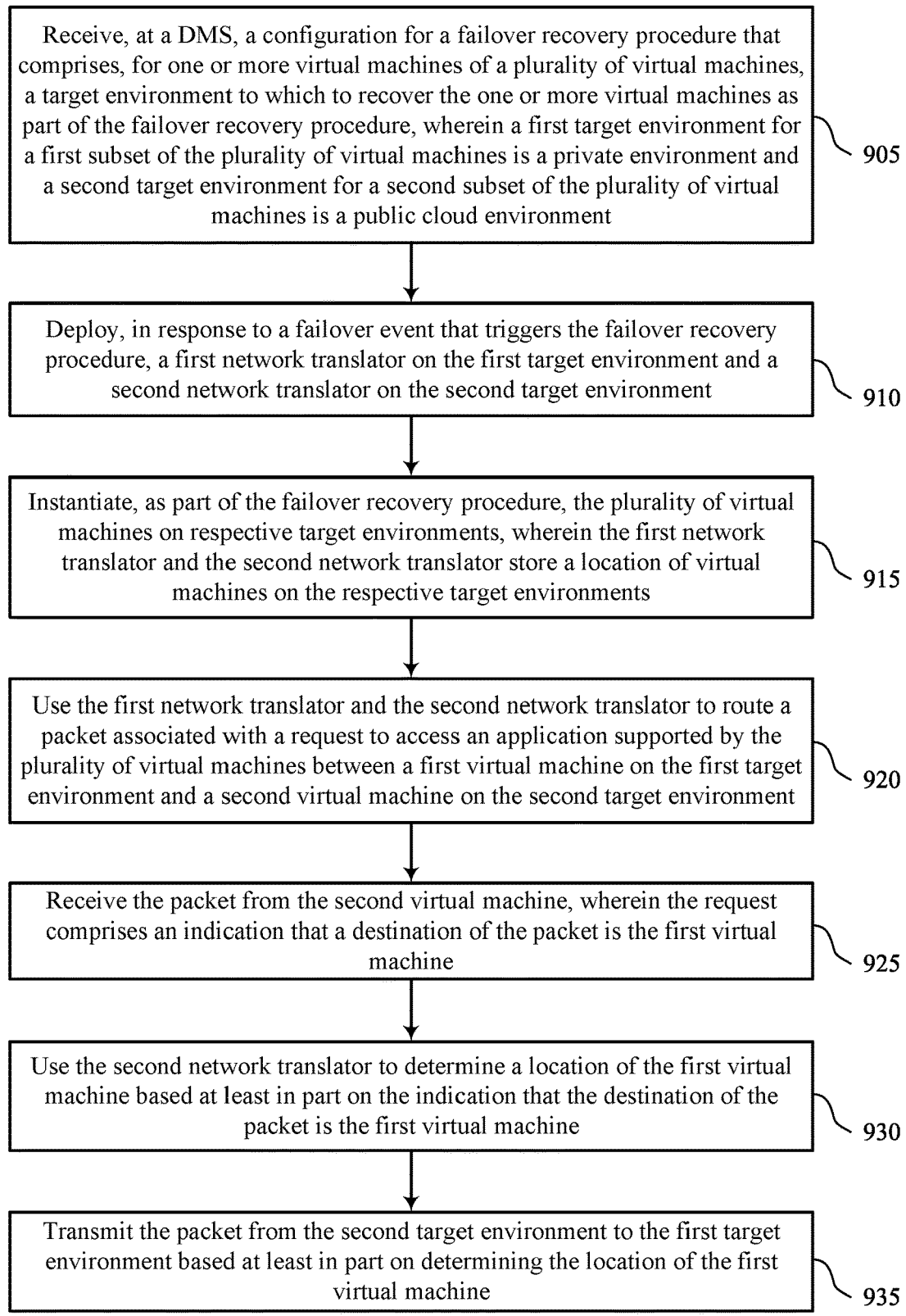

FIG. 9 shows a flowchart illustrating a method 900 that supports failover recovery techniques for multi cloud recovery in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment. The operations of 905 may be performed in accordance with examples as disclosed herein. In some examples, aspects of the operations of 905 may be performed by a configuration component 525 as described with reference to FIG. 5.

At 910, the method may include deploying, in response to a failover event that triggers the failover recovery procedure, a first network translator on the first target environment and a second network translator on the second target environment. The operations of 910 may be performed in accordance with examples as disclosed herein. In some examples, aspects of the operations of 910 may be performed by a translator deployment component 530 as described with reference to FIG. 5.

At 915, the method may include instantiating, as part of the failover recovery procedure, the set of multiple virtual machines on respective target environments, where the first network translator and the second network translator store a location of virtual machines on the respective target environments. The operations of 915 may be performed in accordance with examples as disclosed herein. In some examples, aspects of the operations of 915 may be performed by a virtual machine component 535 as described with reference to FIG. 5.

At 920, the method may include using the first network translator and the second network translator to route a packet associated with a request to access an application supported by the set of multiple virtual machines between a first virtual machine on the first target environment and a second virtual machine on the second target environment. The operations of 920 may be performed in accordance with examples as disclosed herein. In some examples, aspects of the operations of 920 may be performed by a packet routing component 540 as described with reference to FIG. 5.

At 925, to support using the first network translator and the second network translator to route the packet, the method may include receiving the packet from the second virtual machine, where the request includes an indication that a destination of the packet is the first virtual machine. The operations of 925 may be performed in accordance with examples as disclosed herein. In some examples, aspects of the operations of 925 may be performed by a packet routing component 540 as described with reference to FIG. 5.

At 930, to support using the first network translator and the second network translator to route the packet, the method may include using the second network translator to determine a location of the first virtual machine based on the indication that the destination of the packet is the first virtual machine. The operations of 930 may be performed in accordance with examples as disclosed herein. In some examples, aspects of the operations of 930 may be performed by a packet routing component 540 as described with reference to FIG. 5.

At 935, to support using the first network translator and the second network translator to route the packet, the method may include transmitting the packet from the second target environment to the first target environment based on determining the location of the first virtual machine. The operations of 935 may be performed in accordance with examples as disclosed herein. In some examples, aspects of the operations of 935 may be performed by a packet routing component 540 as described with reference to FIG. 5.

A method for data management is described. The method may include receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment, deploying, in response to a failover event that triggers the failover recovery procedure, a first network translator on the first target environment and a second network translator on the second target environment, instantiating, as part of the failover recovery procedure, the set of multiple virtual machines on respective target environments, where the first network translator and the second network translator store a location of virtual machines on the respective target environments, and using the first network translator and the second network translator to route a packet associated with a request to access an application supported by the set of multiple virtual machines between a first virtual machine on the first target environment and a second virtual machine on the second target environment.

An apparatus for data management is described. The apparatus may include a processor, memory coupled with the processor, and instructions stored in the memory. The instructions may be executable by the processor to cause the apparatus to receive, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment, deploy, in response to a failover event that triggers the failover recovery procedure, a first network translator on the first target environment and a second network translator on the second target environment, instantiate, as part of the failover recovery procedure, the set of multiple virtual machines on respective target environments, where the first network translator and the second network translator store a location of virtual machines on the respective target environments, and use the first network translator and the second network translator to route a packet associated with a request to access an application supported by the set of multiple virtual machines between a first virtual machine on the first target environment and a second virtual machine on the second target environment.

Another apparatus for data management is described. The apparatus may include means for receiving, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment, means for deploying, in response to a failover event that triggers the failover recovery procedure, a first network translator on the first target environment and a second network translator on the second target environment, means for instantiating, as part of the failover recovery procedure, the set of multiple virtual machines on respective target environments, where the first network translator and the second network translator store a location of virtual machines on the respective target environments, and means for using the first network translator and the second network translator to route a packet associated with a request to access an application supported by the set of multiple virtual machines between a first virtual machine on the first target environment and a second virtual machine on the second target environment.

A non-transitory computer-readable medium storing code for data management is described. The code may include instructions executable by a processor to receive, at a DMS, a configuration for a failover recovery procedure that includes, for one or more virtual machines of a set of multiple virtual machines, a target environment to which to recover the one or more virtual machines as part of the failover recovery procedure, where a first target environment for a first subset of the set of multiple virtual machines is a private environment and a second target environment for a second subset of the set of multiple virtual machines is a public cloud environment, deploy, in response to a failover event that triggers the failover recovery procedure, a first network translator on the first target environment and a second network translator on the second target environment, instantiate, as part of the failover recovery procedure, the set of multiple virtual machines on respective target environments, where the first network translator and the second network translator store a location of virtual machines on the respective target environments, and use the first network translator and the second network translator to route a packet associated with a request to access an application supported by the set of multiple virtual machines between a first virtual machine on the first target environment and a second virtual machine on the second target environment.

In some examples of the method, apparatuses, and non-transitory computer-readable medium described herein, using the first network translator and the second network translator to route the request may include operations, features, means, or instructions for receiving the packet from the first virtual machine, where the packet includes an indication that a destination of the packet may be the second virtual machine, using the first network translator to determine a location of the second virtual machine based on the indication that the destination of the packet may be the second virtual machine, and transmitting the packet from the first target environment to the second target environment based on determining the location of the second virtual machine.

In some examples of the method, apparatuses, and non-transitory computer-readable medium described herein, using the first network translator and the second network translator to route the request may include operations, features, means, or instructions for receiving the packet from the second virtual machine, where the request includes an indication that a destination of the packet may be the first virtual machine, using the second network translator to determine a location of the first virtual machine based on the indication that the destination of the packet may be the first virtual machine, and transmitting the packet from the second target environment to the first target environment based on determining the location of the first virtual machine.

In some examples of the method, apparatuses, and non-transitory computer-readable medium described herein, using the first network translator and the second network translator to route the request may include operations, features, means, or instructions for receiving the packet at the first network translator from the first virtual machine, where the packet includes an indication that a destination of the packet may be the second virtual machine, using the first network translator to translate a first private IP address associated with the first virtual machine to a first public IP address associated with the first target environment, using the first network translator to determine a second public IP address associated with the second target environment based on the destination of the packet being the second virtual machine and the first network translator storing a location of the second virtual machine, and transmitting the packet to the second network translator, the packet including the first public IP address as a source environment of the packet, the second public IP address as a destination environment of the packet, and the indication that the destination of the packet may be the second virtual machine.

In some examples of the method, apparatuses, and non-transitory computer-readable medium described herein, using the first network translator and the second network translator to route the request may include operations, features, means, or instructions for using the second network translator to determine a second private IP address associated with the second virtual machine based on the indication that the destination of the packet may be the second virtual machine and transmitting the packet to the second virtual machine based on determining the second private IP address.

In some examples of the method, apparatuses, and non-transitory computer-readable medium described herein, using the second network translator to determine the second private IP address may include operations, features, means, or instructions for using the second network translator to translate the indication that the destination of the packet may be the second virtual machine to the second private IP address.

In some examples of the method, apparatuses, and non-transitory computer-readable medium described herein, using the first network translator and the second network translator to route the request may include operations, features, means, or instructions for receiving the packet at the second network translator from the second virtual machine, where the packet includes an indication that a destination of the packet may be the first virtual machine, using the second network translator to translate a first private IP address associated with the second virtual machine to a first public IP address associated with the second target environment, using the second network translator to determine a second public IP address associated with the first target environment based on the destination of the packet being the first virtual machine and the second network translator storing a location of the first virtual machine, and transmitting the packet to the first network translator, the packet including the first public IP address as a source environment of the packet, the second public IP address as a destination environment of the packet, and the indication that the destination of the packet may be the first virtual machine.

In some examples of the method, apparatuses, and non-transitory computer-readable medium described herein, using the first network translator and the second network translator to route the request may include operations, features, means, or instructions for using the first network translator to determine a second private IP address associated with the first virtual machine based on the indication that the destination of the packet may be the first virtual machine and transmitting the packet to the first virtual machine based on determining the second private IP address.

In some examples of the method, apparatuses, and non-transitory computer-readable medium described herein, using the second network translator to determine the second private IP address may include operations, features, means, or instructions for using the first network translator to translate the indication that the destination of the packet may be the first virtual machine to the second private IP address.

Some examples of the method, apparatuses, and non-transitory computer-readable medium described herein may further include operations, features, means, or instructions for booting, before routing the packet, the first virtual machine and the second virtual machine according to a boot order included in the configuration for the failover recovery procedure.

In some examples of the method, apparatuses, and non-transitory computer-readable medium described herein, the packet may be routed from the first virtual machine to the second virtual machine or from the second virtual machine to the first virtual machine in accordance with a boot order of the set of multiple virtual machines included in the configuration for the failover recovery procedure.

In some examples of the method, apparatuses, and non-transitory computer-readable medium described herein, the configuration for the failover recovery procedure includes a set of multiple IP addresses associated with the set of multiple virtual machines, and the method, apparatuses, and non-transitory computer-readable medium may include further operations, features, means, or instructions for assigning, as part of the failover recovery procedure, respective IP addresses to respective virtual machines, where the first network translator and the second network translator store the location of the virtual machines on the respective target environments based on storing the assigned IP addresses.

Some examples of the method, apparatuses, and non-transitory computer-readable medium described herein may further include operations, features, means, or instructions for establishing, using the first network translator and the second network translator, a communication channel between the first target environment and the second target environment, where the request to access the application may be communicated between the first target environment and the second target environment via the communication channel.

In some examples of the method, apparatuses, and non-transitory computer-readable medium described herein, the first network translator stores a first NAT table including a first mapping between private IP addresses associated with virtual machines instantiated on the first target environment and a public IP address associated with the first target environment and the second network translator stores a second NAT table including a second mapping between private IP addresses associated with virtual machines instantiated on the second target environment and a public IP address associated with the second target environment.

In some examples of the method, apparatuses, and non-transitory computer-readable medium described herein, the first network translator stores access information associated with accessing the second target environment and the second network translator stores access information associated with accessing the first target environment and the packet may be routed in accordance with the respective access information.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management, comprising:
receiving, at a data management system, a configuration for a failover recovery procedure that comprises, for one or more virtual machines of a plurality of virtual machines, a target environment to which to recover the one or more virtual machines as part of the failover recovery procedure, wherein a first target environment for a first subset of the plurality of virtual machines is a private environment and a second target environment for a second subset of the plurality of virtual machines is a public cloud environment, wherein the first subset of the plurality of virtual machines comprises a first plurality of virtual machines and wherein the second subset of the plurality of virtual machines comprise a second plurality of virtual machines;

deploying, by the data management system in response to a failover event that triggers the failover recovery procedure, a first network translator on the private environment and a second network translator on the public cloud environment;

establishing, by the first network translator and the second network translator as part of the failover recovery procedure, a communication channel between the private environment and the public cloud environment, the communication channel configured to enable communication between the first target environment and the second target environment;

instantiating, as part of the failover recovery procedure, the plurality of virtual machines on respective target environments, wherein the first network translator and the second network translator store a location of virtual machines on the respective target environments;

receiving, at a first virtual machine of the first plurality of virtual machines in the first subset of the plurality of virtual machines, a request to access an application supported by the plurality of virtual machines in accordance with the first virtual machine supporting reception of the request;

communicating the request to access the application between the private environment and the public cloud environment via the communication channel that is established as part of the failover recovery procedure, wherein communicating the request is in accordance with a second virtual machine of the second plurality of virtual machines in the second subset of the plurality of virtual machines supporting processing of the request; and using the first network translator and the second network translator to route a packet associated with the request between the first virtual machine on the private environment and the second virtual machine on the public cloud environment based at least in part on storing the location of the virtual machines in the respective target environments.

2. The method of claim 1, wherein using the first network translator and the second network translator to route the packet associated with the request comprises:

receiving the packet from the first virtual machine, wherein the packet comprises an indication that a destination of the packet is the second virtual machine;

using the first network translator to determine a location of the second virtual machine based at least in part on the indication that the destination of the packet is the second virtual machine; and transmitting the packet from the private environment to the public cloud environment based at least in part on determining the location of the second virtual machine.

3. The method of claim 1, wherein using the first network translator and the second network translator to route the packet associated with the request comprises:

receiving the packet from the second virtual machine, wherein the request comprises an indication that a destination of the packet is the first virtual machine;

using the second network translator to determine a location of the first virtual machine based at least in part on the indication that the destination of the packet is the first virtual machine; and transmitting the packet from the public cloud environment to the private environment based at least in part on determining the location of the first virtual machine.

4. The method of claim 1, wherein using the first network translator and the second network translator to route the packet associated with the request comprises:

receiving the packet at the first network translator from the first virtual machine, wherein the packet comprises an indication that a destination of the packet is the second virtual machine;

using the first network translator to translate a first private internet protocol address associated with the first virtual machine to a first public internet protocol address associated with the private environment;

using the first network translator to determine a second public internet protocol address associated with the public cloud environment based at least in part on the destination of the packet being the second virtual machine and the first network translator storing a location of the second virtual machine; and transmitting the packet to the second network translator, the packet comprising the first public internet protocol address as a source environment of the packet, the second public internet protocol address as a destination environment of the packet, and the indication that the destination of the packet is the second virtual machine.

5. The method of claim 4, wherein using the first network translator and the second network translator to route the packet associated with the request comprises:

using the second network translator to determine a second private internet protocol address associated with the second virtual machine based at least in part on the indication that the destination of the packet is the second virtual machine; and transmitting the packet to the second virtual machine based at least in part on determining the second private internet protocol address.

6. The method of claim 5, wherein using the second network translator to determine the second private internet protocol address comprises:

using the second network translator to translate the indication that the destination of the packet is the second virtual machine to the second private internet protocol address.

7. The method of claim 1, wherein using the first network translator and the second network translator to route the packet associated with the request comprises:

receiving the packet at the second network translator from the second virtual machine, wherein the packet comprises an indication that a destination of the packet is the first virtual machine;

using the second network translator to translate a first private internet protocol address associated with the second virtual machine to a first public internet protocol address associated with the public cloud environment;

using the second network translator to determine a second public internet protocol address associated with the private environment based at least in part on the destination of the packet being the first virtual machine and the second network translator storing a location of the first virtual machine; and transmitting the packet to the first network translator, the packet comprising the first public internet protocol address as a source environment of the packet, the second public internet protocol address as a destination environment of the packet, and the indication that the destination of the packet is the first virtual machine.

8. The method of claim 7, wherein using the first network translator and the second network translator to route the packet associated with the request comprises:
using the first network translator to determine a second private internet protocol address associated with the first virtual machine based at least in part on the indication that the destination of the packet is the first virtual machine; and
transmitting the packet to the first virtual machine based at least in part on determining the second private internet protocol address.

9. The method of claim 8, wherein using the second network translator to determine the second private internet protocol address comprises:
using the first network translator to translate the indication that the destination of the packet is the first virtual machine to the second private internet protocol address.

10. The method of claim 1, further comprising:
booting, before routing the packet, the first virtual machine and the second virtual machine according to a boot order included in the configuration for the failover recovery procedure.

11. The method of claim 1, wherein the packet is routed from the first virtual machine to the second virtual machine or from the second virtual machine to the first virtual machine in accordance with a boot order of the plurality of virtual machines included in the configuration for the failover recovery procedure.

12. The method of claim 1, wherein the configuration for the failover recovery procedure comprises a plurality of internet protocol addresses associated with the plurality of virtual machines, the method comprising:
assigning, as part of the failover recovery procedure, respective internet protocol addresses to respective virtual machines, wherein the first network translator and the second network translator store the location of the virtual machines on the respective target environments based at least in part on storing the assigned internet protocol addresses.

13. The method of claim 1, wherein:
the first network translator stores a first network address translation table comprising a first mapping between private internet protocol addresses associated with virtual machines instantiated on the private environment and a public internet protocol address associated with the private environment, and
the second network translator stores a second network address translation table comprising a second mapping between private internet protocol addresses associated with virtual machines instantiated on the public cloud environment and a public internet protocol address associated with the public cloud environment.

14. The method of claim 1, wherein:
the first network translator stores access information associated with accessing the public cloud environment and the second network translator stores access information associated with accessing the private environment, and the packet is routed in accordance with the respective access information.

15. An apparatus for data management, comprising:
at least one processor;
memory coupled with the at least one processor; and
instructions stored in the memory and executable by the at least one processor to cause the apparatus to:

receive, at a data management system, a configuration for a failover recovery procedure that comprises, for one or more virtual machines of a plurality of virtual machines, a target environment to which to recover the one or more virtual machines as part of the failover recovery procedure, wherein a first target environment for a first subset of the plurality of virtual machines is a private environment and a second target environment for a second subset of the plurality of virtual machines is a public cloud environment, wherein the first subset of the plurality of virtual machines comprises a first plurality of virtual machines and wherein the second subset of the plurality of virtual machines comprise a second plurality of virtual machines;
deploy, by the data management system in response to a failover event that triggers the failover recovery procedure, a first network translator on the private environment and a second network translator on the public cloud environment;
establish, by the first network translator and the second network translator as part of the failover recovery procedure, a communication channel between the private environment and the public cloud environment, the communication channel configured to enable communication between the first target environment and the second target environment;
instantiate, as part of the failover recovery procedure, the plurality of virtual machines on respective target environments, wherein the first network translator and the second network translator store a location of virtual machines on the respective target environments;
receive, at a first virtual machine of the first plurality of virtual machines in the first subset of the plurality of virtual machines, a request to access an application supported by the plurality of virtual machines in accordance with the first virtual machine supporting reception of the request;
communicate the request to access the application between the private environment and the public cloud environment via the communication channel that is established as part of the failover recovery procedure, wherein communicating the request is in accordance with a second virtual machine of the second plurality of virtual machines in the second subset of the plurality of virtual machines supporting processing of the request; and
use the first network translator and the second network translator to route a packet associated with the request between the first virtual machine on the private environment and the second virtual machine on the public cloud environment based at least in part on storing the location of the virtual machines in the respective target environments.

16. The apparatus of claim 15, wherein the instructions to use the first network translator and the second network translator to route the packet associated with the request are executable by the at least one processor to cause the apparatus to:
receive the packet from the first virtual machine, wherein the packet comprises an indication that a destination of the packet is the second virtual machine;
use the first network translator to determine a location of the second virtual machine based at least in part on the indication that the destination of the packet is the second virtual machine; and transmit the packet from the private environment to the public cloud environment based at least in part on determining the location of the second virtual machine.

17. The apparatus of claim 15, wherein the instructions to use the first network translator and the second network translator to route the packet associated with the request are executable by the at least one processor to cause the apparatus to:
receive the packet from the second virtual machine, wherein the request comprises an indication that a destination of the packet is the first virtual machine;
use the second network translator to determine a location of the first virtual machine based at least in part on the indication that the destination of the packet is the first virtual machine; and
transmit the packet from the public cloud environment to the private environment based at least in part on determining the location of the first virtual machine.

18. The apparatus of claim 15, wherein the instructions are further executable by the at least one processor to cause the apparatus to:
boot, before routing the packet, the first virtual machine and the second virtual machine according to a boot order included in the configuration for the failover recovery procedure.

19. A non-transitory computer-readable medium storing code for data management, the code comprising instructions executable by at least one processor to:
receive, at a data management system, a configuration for a failover recovery procedure that comprises, for one or more virtual machines of a plurality of virtual machines, a target environment to which to recover the one or more virtual machines as part of the failover recovery procedure, wherein a first target environment for a first subset of the plurality of virtual machines is a private environment and a second target environment for a second subset of the plurality of virtual machines is a public cloud environment, wherein the first subset of the plurality of virtual machines comprises a first plurality of virtual machines and wherein the second subset of the plurality of virtual machines comprise a second plurality of virtual machines;
deploy, by the data management system in response to a failover event that triggers the failover recovery procedure, a first network translator on the private environment and a second network translator on the public cloud environment;
establish, by the first network translator and the second network translator as part of the failover recovery procedure, a communication channel between the private environment and the public cloud environment, the communication channel configured to enable communication between the first target environment and the second target environment;
instantiate, as part of the failover recovery procedure, the plurality of virtual machines on respective target environments, wherein the first network translator and the second network translator store a location of virtual machines on the respective target environments;
receive, at a first virtual machine of the first plurality of virtual machines in the first subset of the plurality of virtual machines, a request to access an application supported by the plurality of virtual machines in accordance with the first virtual machine supporting reception of the request;
communicate the request to access the application between the private environment and the public cloud environment via the communication channel that is established as part of the failover recovery procedure, wherein communicating the request is in accordance with a second virtual machine of the second plurality of virtual machines in the second subset of the plurality of virtual machines supporting processing of the request; and
use the first network translator and the second network translator to route a packet associated with the request between the first virtual machine on the private environment and the second virtual machine on the public cloud environment based at least in part on storing the location of the virtual machines in the respective target environments.

20. The apparatus of claim 15, wherein the instructions to use the first network translator and the second network translator to route the packet associated with the request are executable by the at least one processor to cause the apparatus to:
receive the packet at the first network translator from the first virtual machine, wherein the packet comprises an indication that a destination of the packet is the second virtual machine;
use the first network translator to translate a first private internet protocol address associated with the first virtual machine to a first public internet protocol address associated with the private environment;
use the first network translator to determine a second public internet protocol address associated with the public cloud environment based at least in part on the destination of the packet being the second virtual machine and the first network translator storing a location of the second virtual machine; and
transmit the packet to the second network translator, the packet comprising the first public internet protocol address as a source environment of the packet, the second public internet protocol address as a destination environment of the packet, and the indication that the destination of the packet is the second virtual machine.

* * * * *